April 28, 1925.  1,535,702
G. W. WALSH ET AL
LIQUID FUEL BURNER
Filed Feb. 15, 1924
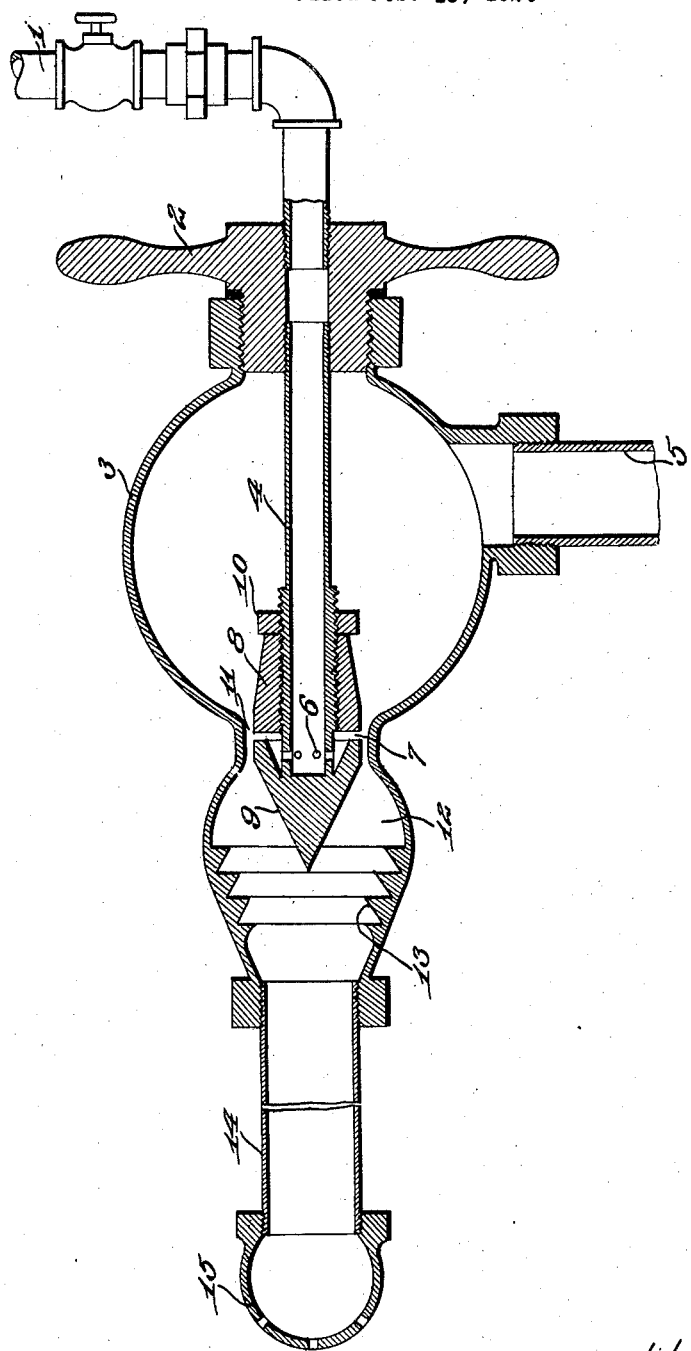

Patented Apr. 28, 1925.

1,535,702

UNITED STATES PATENT OFFICE.

GEORGE W. WALSH, OF BOSTON, AND BLAINE SWEATT, OF EVERETT, MASSACHUSETTS, ASSIGNORS, BY MESNE ASSIGNMENTS, TO SAID WALSH.

LIQUID-FUEL BURNER.

Application filed February 15, 1924. Serial No. 693,100.

*To all whom it may concern:*

Be it known that we, GEORGE W. WALSH and BLAINE SWEATT, citizens of the United States, and residents of Boston, in the county of Suffolk and State of Massachusetts, and Everett, in the county of Middlesex and State of Massachusetts, respectively, have invented a new and useful Improvement in Liquid-Fuel Burners, of which the following is a specification.

Our invention relates to liquid-fuel burners and more especially to such burners for use in power plant boilers, oil stills and the like, although it is capable of use in other relations.

The principal objects of our invention are to provide liquid-fuel burners in which low pressure or exhaust steam may be used for atomizing the oil or liquid-fuel, in which a mixing chamber is provided for receiving the atomized liquid-fuel and further atomizing the same, and in which the atomizer is readily removable from the interior of its casing for the purpose of cleansing the same.

With the foregoing objects in view our invention comprises a source of liquid fuel, a source of low-pressure steam, such for example, as the steam from the power plant exhaust, a steam-expansion chamber connected to the low-pressure steam source and a fuel conduit passing through said expansion chamber, together with an atomizer so located in the expansion chamber that the latter is provided with an annular outlet co-axial with the fuel conduit and having a cross-sectional area which is very small compared to that of the expansion chamber, the fuel conduit being provided with an outlet communicating with a narrow disc-shaped chamber of adjustable width having its plane at right angles to the axis of the annular outlet and its axis coincident with the axis of said outlet, by virtue of which construction the steam flowing from the expansion chamber acquires a high velocity as it passes the periphery of the thin disc of liquid-fuel formed in said disc-shaped chamber and atomizes the same.

Our invention comprises also a mixing chamber arranged for receiving the atomized liquid-fuel and provided with corrugations on its inner surface for further atomizing the liquid fuel.

Other features of novelty will be hereinafter particularly described and set forth in the appended claims.

In the drawing which accompanies and forms a part of this specification the figure is a central longitudinal section of a liquid-fuel burner embodying our invention.

In the particular drawing selected for more fully illustrating the principle of our invention and which is to be considered merely as illustrative and not restrictive, 1 represents a pipe leading to a source of liquid-fuel and connected by means of the wing-nut 2 to a vessel 3 herein shown as globular and to an oil conduit 4 passing through said vessel.

The pipe 5 leads to a source of low pressure steam, such as the exhaust from an engine or turbine, and is threaded to vessel 3 which, having a cross sectional area very much larger than that of said pipe, constitutes an expansion chamber. The fuel conduit is provided with an outlet herein shown as a plurality of radially arranged holes 6, and said outlet communicates with a narrow disc-shaped chamber 7 formed between the cone threaded to the fuel conduit and the cone 9 integral with the same at its outer end.

A lock-nut 10 may be provided for securing the cone 8 in adjusted position.

The vaporizer on the end of the fuel conduit extends through the outlet of the expansion chamber, said outlet being the annular passage 11 coaxial with the fuel conduit, and having a cross-sectional area very small compared to that of the expansion chamber.

Formed integral with the expansion chamber is a vessel 12 constituting a mixing chamber, the inner surface of which is shown as provided with several angular corrugations 13 against which the atomized fuel strikes in its passage through the mixing chamber, and the function of which is to further break up and further atomize the fuel before it passes through the pipe 14 leading to the burner tip 15 located in the boiler furnace.

In practice we have found that the radial width of the annular passage may be one-eighth of an inch, and that the width of the disc-shaped chamber 7 may vary from one thirty-second of an inch to one sixteenth of an inch, depending on the gravity of the oil or other liquid fuel employed.

The operation is as follows:—

The low-pressure steam which may be exhaust steam of from five pounds to ten pounds pressure, enters the chamber 3 and expands, and then by virtue of the cone 8 gradually increases in velocity until it passes through the annular outlet 11 in which it acquires a very high velocity so that as it passes the periphery of the thin disc of liquid-fuel formed in the chamber 7 it breaks up and atomizes the same and drives the fuel so atomized into the mixing chamber 13 where it strikes against the serrated inner surface of the latter and is further broken up and atomized.

It has been found in practice that low-pressure steam will atomize even heavy gravity oil in our improved burner as thoroughly as high-pressure steam accomplishes this result in the burners of the prior art.

Experience has demonstrated the desirability of providing means for detachably securing the atomizer to the expansion chamber for the reason that the outlet 6 and chamber 7 sometimes become clogged, especially when heavy gravity oil is employed.

The wing-nut 2, as will be obvious, affords a convenient means for quickly detaching the atomizer from its associated parts for the purpose of cleaning its passages.

Having thus described an illustrative embodiment of our invention without however limiting ourselves thereto, what we claim and desire to secure by Letters Patent is:—

1. The combination with a source of liquid fuel and a source of low-pressure steam of a liquid-fuel burner comprising a vessel constituting a steam-expansion chamber, a pipe connecting said vessel to said source of low-pressure steam, said vessel having a cross-sectional area very large compared to that of said pipe, a fuel conduit passing through said expansion chamber and connected to said source of liquid fuel, said expansion chamber being provided with an annular outlet co-axial with said conduit and said annular outlet having a cross-sectional area very small compared to that of said expansion chamber, a member on the outer end of said conduit and a member on said conduit intermediate the ends thereof and separated from the first mentioned member to form therewith a narrow disc-shaped chamber co-axial with said annular outlet and having its plane at right angles to the axis thereof, said fuel conduit being provided with an outlet communicating with said narrow disc-shaped chamber, whereby the steam flowing from said expansion chamber requires a high velocity as it passes the periphery of the thin disc of liquid fuel formed in said disc-shaped chamber and atomizes the same.

2. The combination with a source of liquid fuel and a source of low-pressure steam of a liquid-fuel burner comprising a vessel constituting a steam-expansion chamber connected to said source of low-pressure steam, a fuel conduit passing through said expansion chamber and connected to said source of liquid fuel, said expansion chamber being provided with an annular outlet co-axial with said conduit and said annular outlet having a cross-sectional area very small compared to that of said expansion chamber, a member on the outer end of said conduit, and a member adjustable longitudinally along said conduit intermediate the ends thereof and separated from the first mentioned member to form therewith a narrow disc-shaped chamber of variable width co-axial with said annular outlet and having its plane at right angles to the axis thereof, said fuel conduit being provided with an outlet communicating with said narrow disc-shaped chamber, whereby the steam flowing from said expansion chamber acquires a high velocity as it passes the periphery of the thin disc of liquid fuel formed in said disc-shaped chamber and atomizes the same.

In testimony whereof, we have hereunto subscribed our names this 8th day of February, 1924.

GEORGE W. WALSH.
BLAINE SWEATT.